(12) United States Patent
Janson

(10) Patent No.: US 9,784,340 B2
(45) Date of Patent: Oct. 10, 2017

(54) MULTI-SPEED TRANSMISSION

(71) Applicant: Ford Global Technologies, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 14/969,230

(22) Filed: Dec. 15, 2015

(65) Prior Publication Data
US 2016/0102735 A1 Apr. 14, 2016

Related U.S. Application Data

(62) Division of application No. 13/916,673, filed on Jun. 13, 2013, now Pat. No. 9,222,550.

(51) Int. Cl.
| | |
|---|---|
| *F16H 3/66* | (2006.01) |
| *F16H 3/62* | (2006.01) |
| *F16H 57/021* | (2012.01) |
| *F16H 61/02* | (2006.01) |
| *F16H 3/44* | (2006.01) |

(52) U.S. Cl.
CPC ............. *F16H 3/66* (2013.01); *F16H 3/62* (2013.01); *F16H 57/021* (2013.01); *F16H 61/0265* (2013.01); *F16H 2003/442* (2013.01); *F16H 2200/006* (2013.01); *F16H 2200/0069* (2013.01); *F16H 2200/2012* (2013.01); *F16H 2200/2043* (2013.01); *F16H 2200/2046* (2013.01)

(58) Field of Classification Search
CPC ............. F16H 3/66; F16H 2003/442; F16H 2200/0069; F16H 2200/2046; F16H 2200/2012
USPC .................. 475/275–291, 330, 903
See application file for complete search history.

(56) References Cited

U.S. PATENT DOCUMENTS

| | | |
|---|---|---|
| 5,013,289 A | 5/1991 | Van Maanen |
| 5,058,455 A | 10/1991 | Nemoto et al. |
| 5,901,606 A | 5/1999 | Umemoto et al. |
| 6,119,552 A | 9/2000 | Matsufuji |
| 7,073,407 B2 | 7/2006 | Stefina |
| 7,083,540 B2 | 8/2006 | Janson et al. |
| 7,789,792 B2 | 9/2010 | Kamm et al. |
| 9,222,550 B2 * | 12/2015 | Janson ............ F16H 3/66 |
| 2005/0090352 A1 | 4/2005 | Armstrong et al. |
| 2005/0245344 A1 | 11/2005 | Kayama et al. |
| 2006/0142111 A1 * | 6/2006 | Park ............ F16H 3/66 475/269 |
| 2007/0099742 A1 | 5/2007 | Kamada et al. |
| 2007/0275812 A1 | 11/2007 | Tiesler et al. |

(Continued)

*Primary Examiner* — Roger Pang
(74) *Attorney, Agent, or Firm* — James Dotavio; Brooks Kushman P.C.

(57) ABSTRACT

A family of transmission gearing arrangements provides between eight and ten forward speed ratios and a reverse speed ratio. Three planetary gear sets are located on the input axis and a fourth planetary gear set is located on an offset axis. Axis transfer gears convey power between the input axis and the offset axis. One axis transfer gear is supported by a front support while another is supported by a center support. The center support also supports a clutch module and supplies pressurized fluid to engage the clutches in the clutch module.

16 Claims, 5 Drawing Sheets

(56) References Cited

U.S. PATENT DOCUMENTS

| | | |
|---|---|---|
| 2008/0269003 A1 | 10/2008 | Bauknecht et al. |
| 2009/0082159 A1* | 3/2009 | Phillips .................... F16H 3/66 |
| | | 475/218 |
| 2009/0247343 A1 | 10/2009 | Hart et al. |
| 2010/0029433 A1* | 2/2010 | Tenberge ................. F16H 3/66 |
| | | 475/219 |
| 2010/0062893 A1 | 3/2010 | Antonov |
| 2012/0088626 A1 | 4/2012 | Phillips |
| 2012/0088627 A1 | 4/2012 | Phillips |
| 2012/0241278 A1 | 9/2012 | Absenger et al. |
| 2014/0296022 A1 | 10/2014 | Janson et al. |
| 2014/0371024 A1* | 12/2014 | Goleski .................... F16H 3/66 |
| | | 475/275 |
| 2015/0031496 A1* | 1/2015 | Hoffman ................. F16H 3/66 |
| | | 475/280 |

\* cited by examiner

MULTI-SPEED TRANSMISSION

CROSS-REFERENCE TO RELATED APPLICATIONS

This application is a division of U.S. application Ser. No. 13/916,673 filed Jun. 13, 2013, now U.S. Pat. No 9,222,550, issued on Dec. 20, 2015.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

A common type of automatic transmission utilizes a collection of clutches and brakes. Various subsets of the clutches and brakes are engaged to establish the various speed ratios. A common type of clutch utilizes a clutch pack having separator plates splined to a housing and interleaved with friction plates splined to a rotating shell. When the separator plates and the friction plates are forced together, torque may be transmitted between the housing and the shell. Typically, a separator plate on one end of the clutch pack, called a reaction plate, is axially held to the housing. A piston applies axial force to a separator plate on the opposite end of the clutch pack, called a pressure plate, compressing the clutch pack. The piston force is generated by supplying pressurized fluid to a chamber between the housing and the piston. For a brake, the housing may be integrated into the transmission case. For a clutch, the housing rotates. As the pressurized fluid flows from the stationary transmission case to the rotating housing, it may need to cross one or more interfaces between components rotating at different speeds. At each interface, seals direct the flow from an opening in one component into an opening in the interfacing component.

SUMMARY OF THE DISCLOSURE

A transmission provides eight or ten speed ratios between an input shaft on an input axis and an output shaft on an output axis. A first gearing arrangement on the input axis selectively imposes an overdrive relationship between a second shaft and a first shaft. The first gearing arrangement may be, for example, a simple planetary gear set with the sun gear fixedly coupled to the first shaft, the carrier fixedly coupled to the second shaft, and a first brake selectively holding the ring gear against rotation. A second gearing arrangement on the input axis fixedly imposes a linear speed relationship among the first shaft, the input shaft, and a third shaft. The second gearing arrangement may be, for example, a simple planetary gear set with the sun gear fixedly coupled to the first shaft, the carrier fixedly coupled to the input shaft, and the ring gear fixedly coupled to the third shaft. A third gearing arrangement on the output axis fixedly imposes a linear speed relationship among a fifth shaft, the output shaft, and a sixth shaft. The second gearing arrangement may be, for example, a simple planetary gear set with the sun gear fixedly coupled to the sixth shaft, the carrier fixedly coupled to the output shaft, and the ring gear fixedly coupled to the fifth shaft. A fourth gearing arrangement fixedly imposes a proportional speed relationship between the second shaft and the fifth shaft. A fifth gearing arrangement fixedly imposes a proportional speed relationship between a fourth shaft and the sixth shaft. The fourth and fifth gearing arrangements may each be, for example, pairs of axis transfer gears. As another example, the fourth and fifth gearing arrangements may each be two pairs of axis transfer gears in series. The transmission may also include a first brake selectively holding the first shaft against rotation, a first clutch selectively coupling the input shaft to the fourth shaft, a second clutch selectively coupling the second shaft to a seventh shaft, and a third clutch selectively coupling the third shaft to the seventh shaft.

In an eight speed embodiment, a sixth gearing arrangement fixedly imposes a linear speed relationship among the third shaft, the seventh shaft, and the fourth shaft. The sixth gearing arrangement may be, for example, a simple planetary gear set with the sun gear fixedly coupled to the third shaft, the carrier fixedly coupled to the seventh shaft, and the ring gear fixedly coupled to the fourth shaft. To save axial space, the sixth gearing arrangement may be located radially outside the second gearing arrangement.

In a ten speed embodiment, a sixth gearing arrangement selectively imposes a linear speed relationship among the third shaft, the seventh shaft, and the fourth shaft. The sixth gearing arrangement may be, for example, a simple planetary gear set with the sun gear fixedly coupled to the third shaft, the ring gear fixedly coupled to the fourth shaft, and the carrier selectively coupled to the seventh shaft by a fourth clutch. To save axial space, the sixth gearing arrangement may be located radially outside the second gearing arrangement.

In some embodiments, the transmission has a front support and a center support each fixed to a transmission case. A first axis transfer gear is supported by the front support and a second axis transfer gear is supported by the center support on the side opposite the front support. A clutch module is also supported on the center support. In eight speed embodiments, the clutch module includes two clutches. In ten speed embodiments, the clutch module includes three clutches. The clutches are actuated by pressurized fluid routed through passageways in the center support into corresponding passageways in the clutch module.

DETAILED DESCRIPTION

Figure 1:
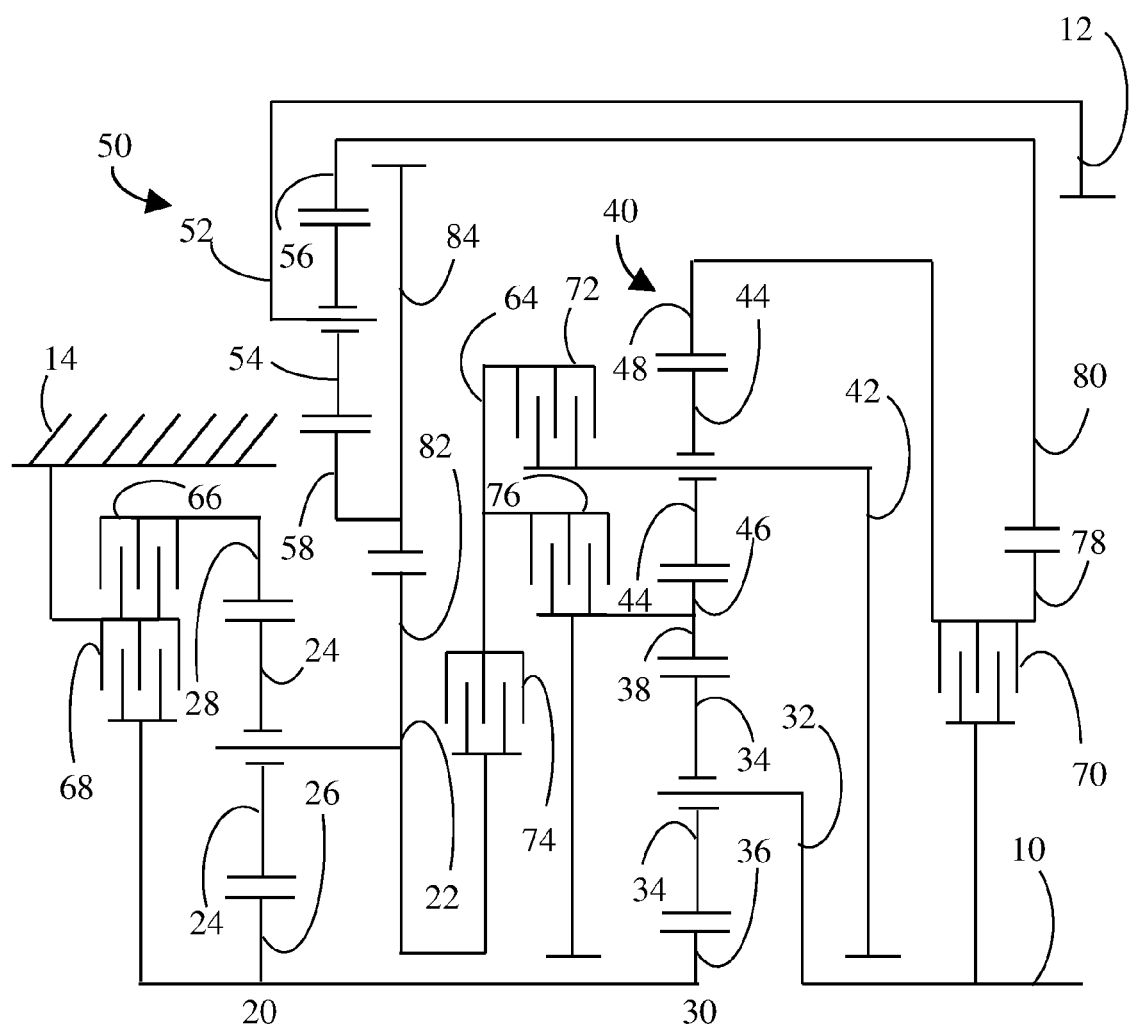
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A proportional speed relationship between two elements when the ratio between the speeds of the elements is a predetermined value. A proportional speed relationship between a first element and a second element is an overdrive relationship if the second element always rotates faster than and in the same direction as the first element. Similarly, a proportional speed relationship between a first element and a second element is an underdrive relationship if the second element always rotates slower than and in the same direction as the first element.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An element is a transmission input if it is adapted to be fixedly coupled to either a power source or the output of a launch device. A power source may be, for example, an internal combustion engine or an electric motor. A launch device may be, for example, a torque converter or a launch clutch. The input may be coupled to the power source or launch device via a damper designed to absorb torsional vibrations. An element is a transmission output if it is adapted to transmit power to components outside the transmission such as vehicle wheels. There may be a fixed speed ratio other than 1:1 between the output element and the driven component.

An example transmission is schematically illustrated in FIG. 1. In this transmission, input 10 is driven by the engine, preferably via a launch device such as a torque converter or launch clutch. Output gear 12 rotates about a second axis that is parallel to and offset from the input axis. An additional gear, not shown, transmits power from the output gear to the differential which is located on a third axis.

The transmission of FIG. 1 utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes a fixed speed relationship. The speed of the carrier is constrained to be between the speed of the sun gear and the speed of the ring gear. More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. Gear sets 30, 40, and 50 are similarly structured.

The transmission also utilizes four axis transfer gears 78, 80, 82, and 84. A pair of meshing axis transfer gears forms another type of fixed gearing arrangement. Axis transfer gear 78 is supported to rotate about a first axis while axis transfer gear 80 is supported to rotate about second axis parallel to and offset from the first axis. External gear teeth on the gear 78 mesh with external gear teeth on a gear 80. A pair of meshing axis transfer gears imposes a proportional speed relationship. The gears rotate in opposite directions at speeds related by the ratio of the number of teeth on each gear. Proportional speed relationships are imposed by other known types of fixed gearing arrangements. For example, a chain and sprocket arrangement imposes a proportional speed relationship between the sprockets. As another example, a planetary gear set with one element held against rotation imposes a proportional speed relationship between the remaining two elements.

A suggested ratio of gear teeth for each planetary gear set is listed in Table 1.

TABLE 1

| | |
|---|---|
| Ring 28/Sun 26 | 2.20 |
| Ring 38/Sun 36 | 1.75 |
| Ring 48/Sun 46 | 1.60 |
| Ring 58/Sun 56 | 3.70 |
| Gear 80/Gear 78 | 1.00 |
| Gear 84/Gear 82 | 1.00 |

Sun gear 26 is fixedly coupled to sun gear 36 forming a first shaft. Carrier 22 is fixedly couple to axis transfer gear 82 forming a second shaft. Ring gear 38 is fixedly coupled to sun gear 46 forming a third shaft. Ring gear 48 is fixedly coupled to axis transfer gear 78 forming a fourth shaft. Input shaft 10 is fixedly coupled to carrier 32. Ring gear 58 is fixedly coupled to axis transfer gear 84 forming a fifth shaft. Sun gear 56 is fixedly coupled to axis transfer gear 80 forming a sixth shaft. Finally, output shaft 12 is fixedly coupled to carrier 52.

Ring gear 28 is selectively held against rotation by brake 66 and the first shaft (sun gears 26 and 36) is selectively held against rotation by brake 68. Input shaft 10 is selectively coupled to the fourth shaft (ring gear 48 and axis transfer gear 78) by clutch 70. Intermediate shaft 64 is selectively coupled to carrier 42 by clutch 72, selectively coupled to the second shaft (carrier 22 and axis transfer gear 82) by clutch 74, and selectively coupled to the third shaft (ring gear 38 and sun gear 46) by clutch 76.

Various combinations of gearing and shift elements impose particular speed relationships among the shafts. Planetary gear set 20 and brake 66 selectively impose an overdrive relationship between the second shaft and the first shaft. In other words, when brake 66 is engaged, sun gear 26 rotates faster than carrier 22 and in the same direction. Gear set 30 fixedly imposes a linear speed relationship between the first shaft, the input shaft, and the third shaft. Similarly, gear set 50 fixedly imposes a linear speed relationship between the fifth shaft, the output shaft, and the sixth shaft. Axis transfer gears 82 and 84 fixedly impose a proportional speed relationship between the second and the fifth shafts. Similarly, axis transfer gears 78 and 80 fixedly impose a proportional speed relationship between the fourth shaft and the sixth shaft.

As shown in Table 2, engaging the shift elements in combinations of four establishes ten forward speed ratios and one reverse speed ratio between input shaft 10 and output shaft 12. An X indicates that the shift element is required to establish the speed ratio. An (X) indicates the shift element can be applied but is not required. In 1st gear, either clutch 74 or clutch 76 can be applied instead of applying clutch 72 without changing the speed ratio. When the gear sets have tooth numbers as indicated in Table 1, the speed ratios have the values indicated in Table 2.

TABLE 2

| | 66 | 68 | 70 | 72 | 74 | 76 | Ratio | Step |
|---|---|---|---|---|---|---|---|---|
| Rev | X | X | | X | X | | −4.79 | 102% |
| $1^{st}$ | X | X | X | (X) | | | 4.70 | |
| $2^{nd}$ | X | X | | X | | X | 2.99 | 1.57 |
| $3^{rd}$ | X | | X | X | | X | 2.18 | 1.37 |
| $4^{th}$ | X | | | X | X | X | 1.80 | 1.21 |
| $5^{th}$ | X | | X | | X | X | 1.54 | 1.17 |
| $6^{th}$ | X | | | X | X | X | 1.29 | 1.19 |

TABLE 2-continued

| | 66 | 68 | 70 | 72 | 74 | 76 | Ratio | Step |
|---|---|---|---|---|---|---|---|---|
| $7^{th}$ | | X | X | X | X | | 1.00 | 1.29 |
| $8^{th}$ | X | X | X | X | | | 0.85 | 1.17 |
| $9^{th}$ | | X | X | | X | X | 0.69 | 1.24 |
| $10^{th}$ | | X | | X | X | X | 0.64 | 1.08 |

Figure 2:
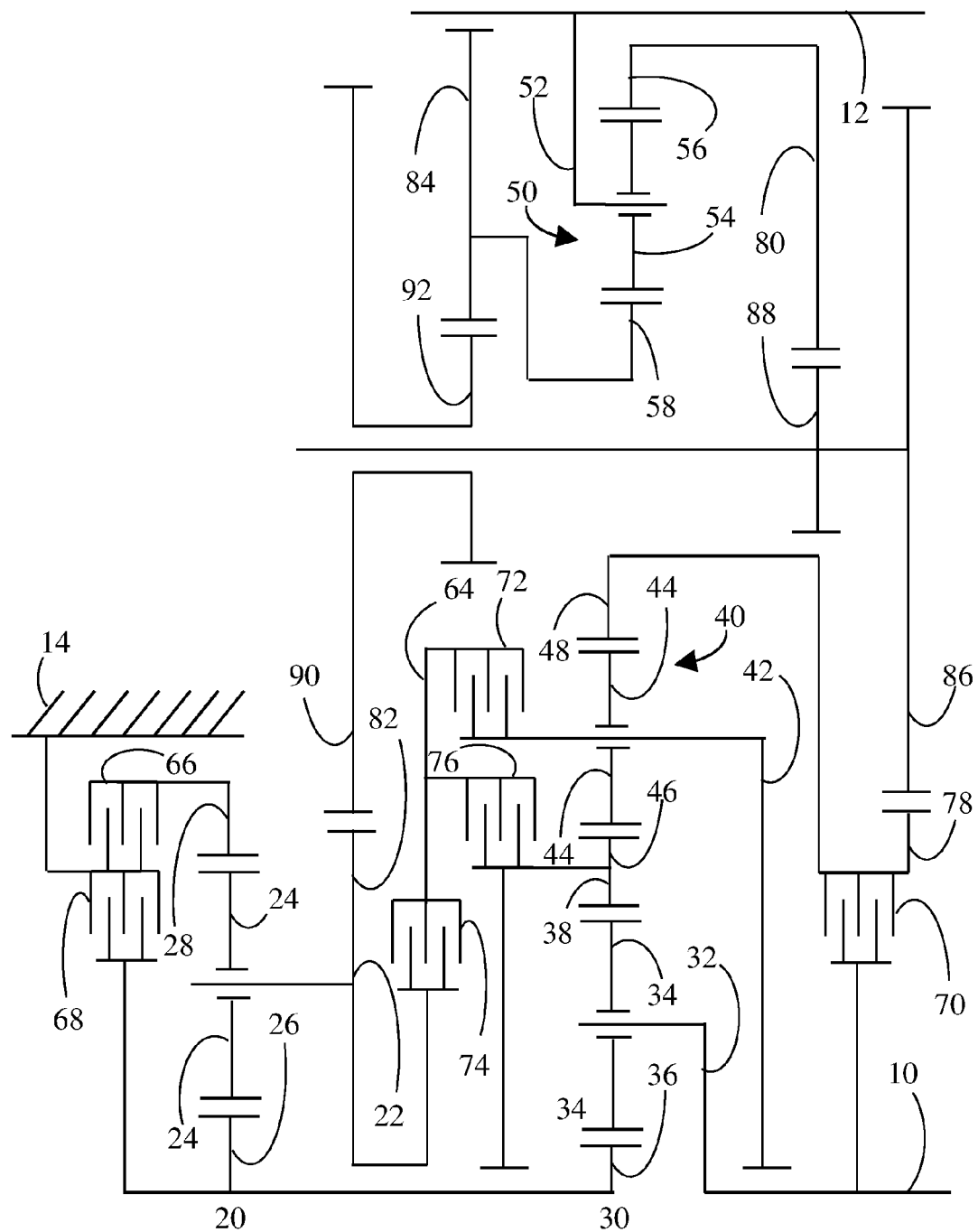
FIG. 2 is a schematic diagram of a second transmission gearing arrangement.

Another example transmission is illustrated in FIG. 2. In this transmission, output shaft 12 and planetary gear set 50 are located on the same axis as the differential. Axis transfer gears 86, 88, 90, and 92 all rotate about an intermediate axis parallel to and offset from both the input shaft axis and the output shaft axis. Axis transfer gears 86, 88, 90, and 92 are in continuous meshing engagement with axis transfer gears 78, 80, 82, and 84 respectively. Gear 86 is fixedly coupled to gear 88. Gear 90 is fixedly coupled to gear 92. Alternatively, gears 90 and 92 could rotate about a different axis than gears 86 and 88. Axis transfer gears 82, 90, 92, and 84 fixedly impose a proportional speed relationship between the second and the fifth shafts. Similarly, axis transfer gears 78, 86, 88, and 80 fixedly impose a proportional speed relationship between the fourth shaft and the sixth shaft.

Figure 3:
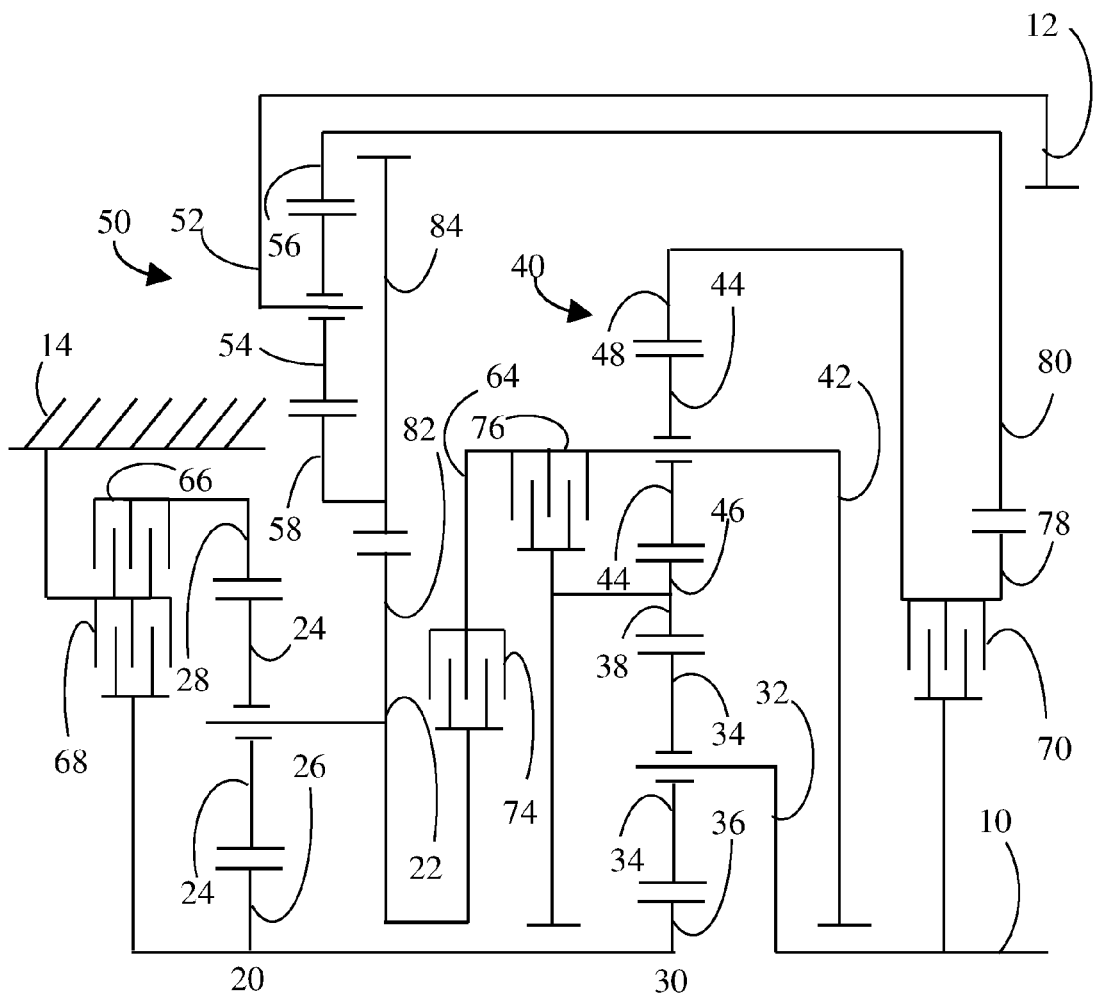
FIG. 3 is a schematic diagram of a third transmission gearing arrangement.

A third example transmission is illustrated in FIG. 3. In this transmission, clutch 72 has been replaced with a fixed connection between intermediate shaft 64 and carrier 42. As shown in Table 3, engaging the shift elements in combinations of three establishes eight forward speed ratios and one reverse speed ratio between input shaft 10 and output shaft 12. When the gear sets have tooth numbers as indicated in Table 1, the speed ratios have the values indicated in Table 3.

TABLE 3

| | 66 | 68 | 70 | 74 | 76 | Ratio | Step |
|---|---|---|---|---|---|---|---|
| Rev | X | X | | X | | −4.79 | 102% |
| $1^{st}$ | X | X | X | | | 4.70 | |
| $2^{nd}$ | X | X | | | X | 2.99 | 1.57 |
| $3^{rd}$ | X | | X | | X | 2.18 | 1.37 |
| $4^{th}$ | X | | | X | X | 1.80 | 1.21 |
| $5^{th}$ | X | | | X | X | 1.29 | 1.40 |
| $6^{th}$ | | | X | X | X | 1.00 | 1.29 |
| $7^{th}$ | | X | X | X | | 0.85 | 1.17 |
| $8^{th}$ | | X | | X | X | 0.64 | 1.32 |

Figure 4:
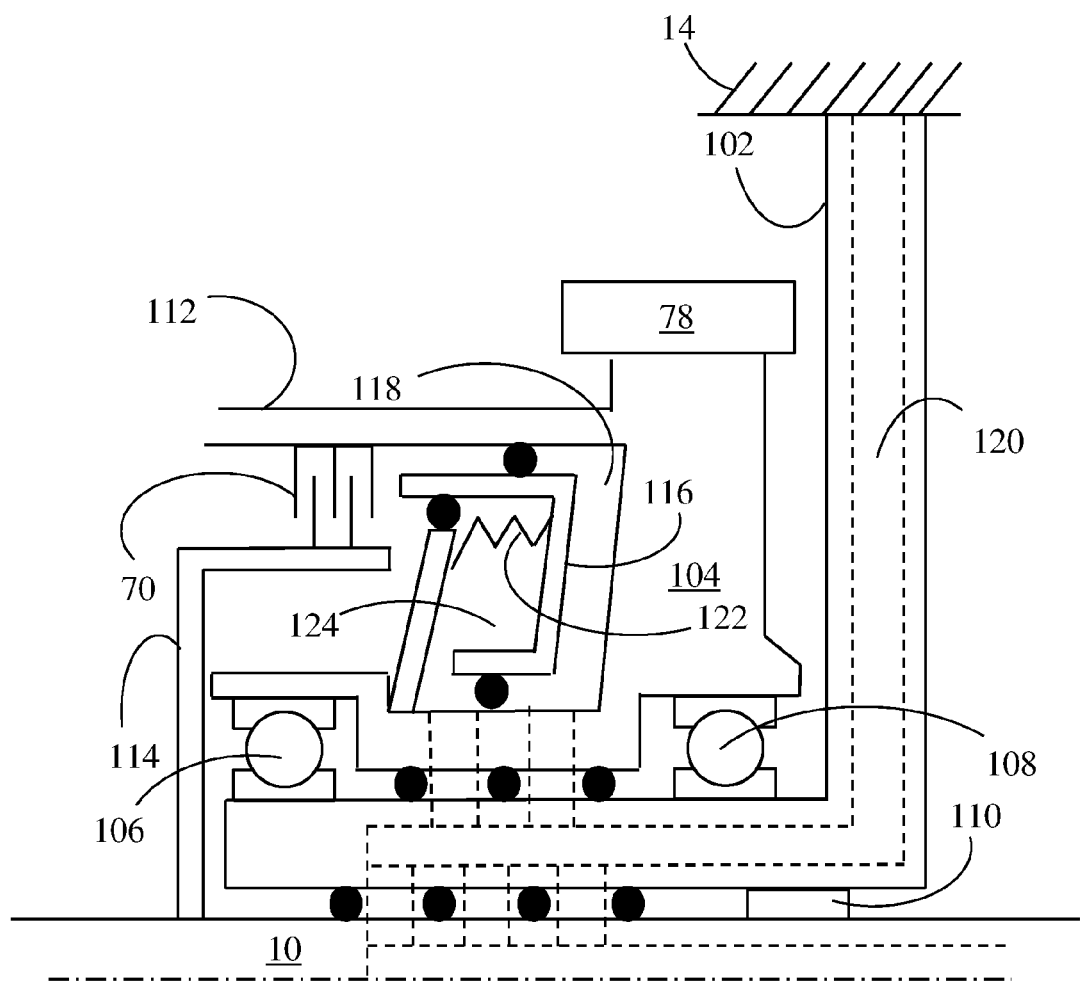
FIG. 4 is a cross sectional view of a front support and clutch of a transmission according to the transmission arrangements of either FIG. 1, FIG. 2, or FIG. 3.

FIG. 4 is a cross sectional view of a front support, clutch 70, and axis transfer gear 78. Front support 102 is fixed to transmission case 14 between the gearbox and the launch device. Housing 104 is supported for rotation about the front support by bearings 106 and 108. Input shaft 10 is supported for rotation by bearing 110. Axis transfer gear 78 is fixed to housing 102. Shell 112 connects housing 102 to ring gear 48. The separator plates of clutch pack 70 are splined to shell 112 and interleaved with friction plates splined to hub 114 which is fixed to input shaft 10. Piston 116 is supported within housing 104 between seals to form clutch apply chamber 118.

A series of passageways 120 formed into front support 104 route fluid from a valve body to various destinations. Seals separate the fluid passageways as they pass between the stationary front support and the rotating input shaft 10 or housing 102. Some passageways route fluid into input shaft 10 to control a torque converter. One passageway routes fluid into clutch apply chamber 118. When fluid within clutch apply chamber 118 is pressurized, piston 116 slides axially and forces the separator plates and friction plates of clutch pack 70 together. Frictional forces between the separator plates and friction plates transmit torque between the input shaft 10 and housing 104. When the pressure in clutch apply chamber 118 is reduced, return spring 122 forces the piston to slide away from clutch pack 70. Centrifugal forces can pressurize fluid within clutch apply chamber 118, which if not compensated, could cause unintended clutch application. To compensate, another passageway routed unpressurized fluid into balance chamber 124.

Figure 5:
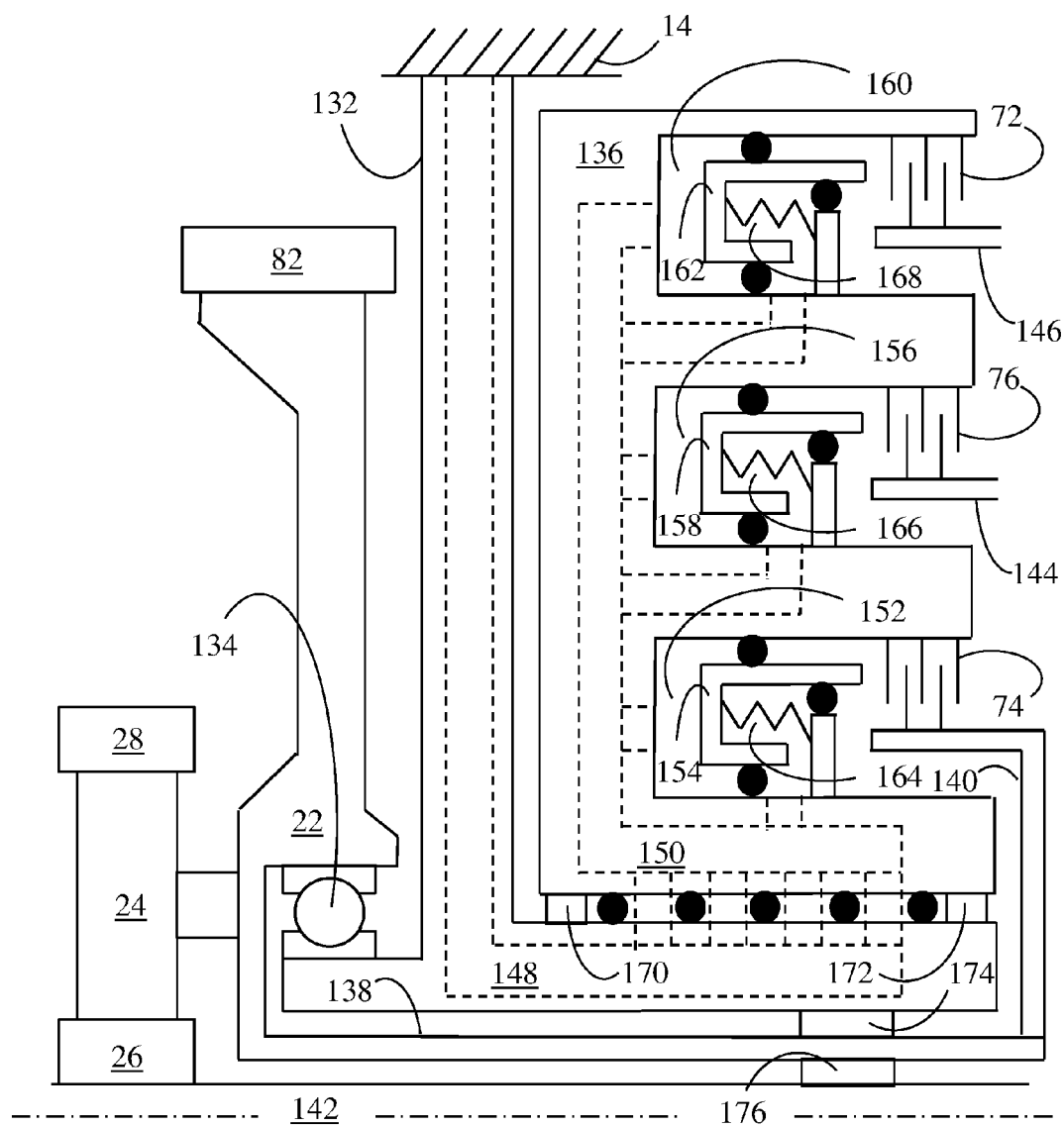
FIG. 5 is a cross sectional view of a center support and clutch module of a transmission according to the transmission arrangements of either FIG. 1 or FIG. 2.

FIG. 5 is a cross sectional view of a center support, clutch module, gear set 20, and axis transfer gear 82. Center support 132 is fixed to transmission case 14. Carrier 22 is supported for rotation about the center support by bearing 134. Axis transfer gear 82 is fixed to carrier 22. Clutch housing 136 is supported for rotation about center support 132 on the opposite side from carrier 22 by bearings 170 and 172. Hollow shaft 138 extends through center support 132 connecting carrier 22 to clutch hub 140. Hollow shaft 138 is supported by center support 132 by bearing 174. Shaft 142 extends through hollow shaft 138 and connects sun gear 26 to sun gear 36. Shaft 142 is supported by bearing 176. Clutch hub 144 is fixed to ring gear 38 and sun gear 46. Clutch hub 146 is fixed to carrier 42.

A network of passageways 148 in center support 132 carries fluid from the valve body. A network of passageways 150 in clutch housing 136 routes fluid to various chambers to engage clutches 72, 74, and 76. Fluid passes between center support 132 and clutch housing 136 between seals such that each passageway in the center support is fluidly connected to a particular passageway in clutch housing 136. One passageway provides fluid to clutch apply chamber 152, forcing piston 154 to engage clutch 74. Another passageway provides fluid to clutch apply chamber 156, forcing piston 158 to engage clutch 76. A third passageway provides fluid to clutch apply chamber 160, forcing piston 162 to engage clutch 72. Finally, a fourth passageway provides unpressurized fluid to balance chambers 164, 166, and 168 to prevent unintended clutch application due to centrifugal force.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
    an input shaft configured to rotate about an input axis;
    an output shaft configured to rotate about an output axis offset from the input axis;
    first, second, third, and fourth shafts configured to rotate about the input axis;
    fifth and sixth shafts configured to rotate about the output axis;
    a first gearing arrangement configured to selectively impose an overdrive relationship between the second shaft and the first shaft;
    a second gearing arrangement configured to fixedly impose a linear speed relationship among the first shaft, the input shaft, and the third shaft;
    a third gearing arrangement configured to fixedly impose a linear speed relationship among the fifth shaft, the output shaft, and the sixth shaft;
    a fourth gearing arrangement configured to fixedly impose a proportional speed relationship between the second shaft and the fifth shaft; and
    a fifth gearing arrangement configured to fixedly impose a proportional speed relationship between the fourth shaft and the sixth shaft.

2. The transmission of claim 1 wherein the first gearing arrangement comprises:
    a first sun gear fixedly coupled to the first shaft;
    a first ring gear;
    a first carrier fixedly coupled to the second shaft;
    a first set of planet gears supported for rotation relative to the first carrier and in continuous meshing engagement with the first sun gear and the first ring gear; and
    a first brake configured to selectively hold the first ring gear against rotation.

3. The transmission of claim 1 wherein the second gearing arrangement comprises:
    a second sun gear fixedly coupled to the first shaft;
    a second ring gear fixedly coupled to the third shaft;
    a second carrier fixedly coupled to the input shaft; and
    a second set of planet gears supported for rotation relative to the second carrier and in continuous meshing engagement with the second sun gear and the second ring gear.

4. The transmission of claim 1 wherein the third gearing arrangement comprises:
    a third sun gear fixedly coupled to the fifth shaft;
    a third ring gear fixedly coupled to the sixth shaft;
    a third carrier fixedly coupled to the output shaft; and
    a third set of planet gears supported for rotation relative to the third carrier and in continuous meshing engagement with the third sun gear and the third ring gear.

5. The transmission of claim 1 wherein the fourth gearing arrangement comprises:
    a first axis transfer gear fixedly coupled to the second shaft; and
    a second axis transfer gear fixedly coupled to the fifth shaft and in continuous meshing engagement with the first axis transfer gear.

6. The transmission of claim 1 wherein the fifth gearing arrangement comprises:
    a third axis transfer gear fixedly coupled to the fourth shaft; and
    a fourth axis transfer gear fixedly coupled to the sixth shaft and in continuous meshing engagement with the third axis transfer gear.

7. The transmission of claim 1 wherein the fourth gearing arrangement comprises:
    a first axis transfer gear fixedly coupled to the second shaft;
    a fifth axis transfer gear configured to rotate about an intermediate axis and in continuous meshing engagement with the first axis transfer gear;

a sixth axis transfer gear fixedly coupled to the fifth axis transfer gear; and a second axis transfer gear fixedly coupled to the fifth shaft and in continuous meshing engagement with the sixth axis transfer gear.

8. The transmission of claim 1 wherein the fifth gearing arrangement comprises:

a third axis transfer gear fixedly coupled to the fourth shaft; and a seventh axis transfer gear configured to rotate about an intermediate axis and in continuous meshing engagement with the third axis transfer gear;

an eighth axis transfer gear fixedly coupled to the seventh axis transfer gear; and a fourth axis transfer gear fixedly coupled to the sixth shaft and in continuous meshing engagement with the eighth axis transfer gear.

9. The transmission of claim 1 further comprising:

a seventh shaft configured to rotate about the input axis;

a second brake configured to selectively hold the first shaft against rotation;

a first clutch configured to selectively couple the input shaft to the fourth shaft;

a second clutch configured to selectively couple the second shaft to the seventh shaft; and a third clutch configured to selectively couple the third shaft to the seventh shaft.

10. The transmission of claim 9 further comprising:

a sixth gearing arrangement configured to fixedly impose a linear speed relationship among the third shaft, the seventh shaft, and the fourth shaft.

11. The transmission of claim 10 wherein the sixth gearing arrangement comprises:

a fourth sun gear fixedly coupled to the third shaft;

a fourth ring gear fixedly coupled to the fourth shaft;

a fourth carrier fixedly coupled to the seventh shaft; and a fourth set of planet gears supported for rotation relative to the fourth carrier and in continuous meshing engagement with the fourth sun gear and the fourth ring gear.

12. The transmission of claim 9 wherein the third clutch is configured to selectively couple the third shaft directly to the seventh shaft.

13. The transmission of claim 9 wherein the sixth gearing arrangement is located radially outside the second gearing arrangement.

14. The transmission of claim 9 further comprising:

a sixth gearing arrangement configured to selectively impose a linear speed relationship among the third shaft, the seventh shaft, and the fourth shaft.

15. The transmission of claim 14 wherein the sixth gearing arrangement comprises:

a fourth sun gear fixedly coupled to the third shaft;

a fourth ring gear fixedly coupled to the fourth shaft;

a fourth carrier;

a fourth set of planet gears supported for rotation relative to the fourth carrier and in continuous meshing engagement with the fourth sun gear and the fourth ring gear; and a fourth clutch configured to selectively couple the seventh shaft to the fourth carrier.

16. The transmission of claim 14 wherein the sixth gearing arrangement is located radially outside the second gearing arrangement.

\* \* \* \* \*